United States Patent [19]

Miyoshi et al.

[11] Patent Number: 4,689,265

[45] Date of Patent: Aug. 25, 1987

[54] MAGNETIC RECORDING MEDIUM

[75] Inventors: Takahito Miyoshi; Masaaki Fujiyama, both of Odawara, Japan

[73] Assignee: Fuji Photo Film Co., Ltd., Japan

[21] Appl. No.: 792,896

[22] Filed: Oct. 30, 1985

[30] Foreign Application Priority Data

Oct. 31, 1984 [JP] Japan .................. 59-229638

[51] Int. Cl.$^4$ ............................. G11B 5/708
[52] U.S. Cl. ................. 428/323; 252/62.54; 252/62.55; 427/128; 428/328; 428/329; 428/694; 428/900
[58] Field of Search ............ 252/62.54, 62.55; 428/694, 900, 328, 329, 323; 360/134–136; 427/128, 645

[56] References Cited

U.S. PATENT DOCUMENTS

| | | |
|---|---|---|
| 2,456,313 | 12/1948 | Pratt ................... 252/62.54 |
| 2,804,401 | 8/1957 | Cousino .............. 252/62.54 |
| 3,423,233 | 1/1969 | Akashi ................ 252/62.54 |
| 3,687,725 | 8/1972 | Hartman ............ 252/62.5 X |
| 3,995,089 | 11/1976 | Hartman ............ 428/425.9 |

FOREIGN PATENT DOCUMENTS 0068232  4/1983  Japan ................ 252/62.54

Primary Examiner—Ellis P. Robinson
Attorney, Agent, or Firm—Ostrolenk, Faber, Gerb & Soffen

[57] ABSTRACT

A magnetic recording medium comprising a nonmagnetic support and a magnetic recording layer provided on said support, said magnetic recording layer comprising a ferromagnetic powder dispersed in a binder, characterized in that said magnetic recording layer contains an inorganic plate powder having the maximum diameter of not larger than 1.0 μm and a thickness of not larger than 0.1 μm.

10 Claims, No Drawings

MAGNETIC RECORDING MEDIUM

BACKGROUND OF THE INVENTION

1. Field of the invention

The present invention relates to a magnetic recording medium. More particularly, the invention relates to an improvement of a magnetic recording medium comprising a nonmagnetic support and a magnetic recording layer.

2. Description of Prior Arts

A magnetic recording medium such as an audio-tape, a video-tape, or a recording medium employed in a computer system, basically comprises a nonmagnetic support and a magnetic recording layer provided on the support. The magnetic recording layer comprises a ferromagnetic powder such as a needle crystalline powder of $\gamma\text{-Fe}_2\text{O}_3$, Co-containing ferromagnetic iron oxide, or $CrO_2$ dispersed in a binder. Recently, the demand for a higher density recording system has increased, and hence studies of magnetic recording medium using a ferromagnetic metal powder in place of the conventional oxide-type ferromagnetic powder have been made.

The ferromagnetic metal powder has been employed as a ferromagnetic powder of a recording medium of a computer system. The ferromagnetic metal powder is high in a coercive force (Hc) and a residual flux density (Br), and moreover is stable in a wide temperature range. For these reasons, attention has been also paid for use in such magnetic recording media as a video-tape or an audio-tape. The ferromagnetic metal powder is known to afford recording of a higher density, as the powder is minimized.

While the ferromagnetic metal powder has excellent characteristics, there is a drawback in that the ferromagnetic metal powder is low in hardness. In more detail, a magnetic recording layer using the metal powder shows a poor running property, that is, the recording layer is easily scratched or the metal powder is easily dropped off from the layer in the course of running in contact with a magnetic head. These troubles cause the so-called dropouts. Further, the dropped metal powder is apt to adhere to the surface of the magnetic head to cause clogging on the head. Furthermore, if a magnetic layer has a poor running property, the magnetic layer shows only short still life in the still mode in which a still video image is continuously reproduced.

It is known that the running property of a magnetic recording layer is improved by incorporating abrasives (i.e., hard particles) such as corundum, silicon carbide or chromium oxide in the recording layer. However, the effect of incorporation of an abrasive is shown only where the abrasive is incorporated in a large amount. However, a magnetic recording layer containing a large amount of an abrasive likely causes extreme abrasion of the magnetic head employed in contact with the recording layer. Further, a large amount of an abrasive is unfavorable to the electromagnetic conversion characteristics of the recording medium. Furthermore, the incorporated abrasive is apt to be easily dropped off to adhere to the surface of the magnetic head.

For the above-described reasons, the conventional measure for improving the running property of the magnetic recording layer is not thought to be satisfactory, in view of the resulting characteristics of the magnetic recording medium as well as the unfavorable effect given to a magnetic head.

Accordingly, an improvement of the running property is not only desired in a recording medium using a ferromagnetic metal powder but also in the conventional recording medium using such a ferromagnetic powder as an oxidetype powder of $\gamma\text{-Fe}_2\text{O}_3$, Co-containing ferromagnetic ferrite, or $CrO_2$.

SUMMARY OF THE INVENTION

It is an object of the present invention to provide a magnetic recording medium which is improved particularly with respect to the running property.

Especially, the invention has an object to provide an improved magnetic recording medium using a ferromagnetic metal powder which is improved particularly with respect to the running property.

There is provided by the present invention a magnetic recording medium comprising a nonmagnetic support and a magnetic recording layer provided on said support, said magnetic recording layer comprising a ferromagnetic powder dispersed in a binder, which is characterized in that said magnetic recording layer contains an inorganic plate powder having the maximum diameter of not larger than 1.0 $\mu$m and a thickness of not larger than 0.1 $\mu$m.

The present invention is advantageously employable in a magnetic recording medium using a conventional ferromagnetic powder, but is more advantageously employable in a magnetic recording medium using a ferromagnetic metal powder of a specific surface area of not less than 40 $m^2/g$.

The magnetic recording medium of the invention exhibits an improved running property. For instance, the ferromagnetic powder is more difficultly dropped off from the recording layer when the medium runs in contact with a magnetic head. Accordingly, the surface of the magnetic head can be kept under relatively clean conditions. Further, the magnetic recording medium of the invention shows less drop-out. Particularly, a magnetic recording medium of the invention in the form of a video-tape using a ferromagnetic metal powder shows improved electromagnetic conversion characteristics such as an enhanced regeneration output. In the magnetic recording medium of the invention, the incorporation of an inorganic plate powder serves to prominently enhance the running property of the recording layer. Nevertheless, the incorporation of inorganic plate powder gives almost no adverse influence to the electromagnetic conversion characteristics of the recording medium.

DETAILED DESCRIPTION OF THE INVENTION

A magnetic recording medium of the invention comprises a nonmagnetic support and a magnetic recording layer provided on the support. The magnetic recording layer comprises a ferromagnetic powder dispersed in a binder.

There is no specific limitation on the nonmagnetic support employable in the present invention.

The material of the nonmagnetic support is not particularly limited and can be selected, for example, from polyethylene terephthalate, polypropylene, polycarbonate, polyethylene naphthalate, polyamide, polyamideimide, polyimide and metallic foils such as aluminum foil and stainless steel foil. The thickness of the support film generally is in the range of 3 to 50 μm and preferably in the range of 5 to 30 μm.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a ferromagnetic powder dispersed in a binder.

The ferromagnetic powder employable in the invention is not particularly restricted and can be selected from, for example, $\gamma$-$Fe_2O_3$, $Fe_3O_4$, Co-modified iron oxide, metal powder having iron atom as a major component, barium ferrite and strontium ferrite.

The present invention is particularly advantageous in the case of using a ferromagnetic metal powder which contains Fe, Co or Ni and has a specific surface area of not less than 40 m$^2$/g, because in such case the effect of the incorporation of the inorganic plate powder is prominently observed.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods.

For instance, a ferromagnetic alloy powder can be prepared by the following known processes.

(a) a process of reducing a double organic acid salt (typically an oxalate) by a reducing gas such as hydrogen;

(b) a process of reducing a ferric oxide and/or other metal oxide by a reducing gas such as hydrogen to obtain Fe particle, Fe-Co particle, etc.;

(c) a process of thermally decomposing a metal carbonyl compound;

(d) a process of reducing a ferromagnetic metal in an aqueous solution in the presence of a reducing agent such as sodium borohydride, hypophosphite or hydrazine;

(e) a process of electrolyzing a ferromagnetic metal solution at a mercury electrode and separating the deposited ferromagnetic metal powder from mercury; and (f) a process of evaporating a metal in an inert atmosphere under reduced pressure to obtain a fine powder.

The shape of the ferromagnetic powder normally used is needle shape, grain shape, dice shape, rice shape or plate shape. The size of ferromagnetic powder is normally not greater than 1 μm, and preferably not greater than 0.5 μm. In the case of using a ferromagnetic metal powder, its specific surface area preferably is not less than 40 m$^2$/g, and more preferably not less than 45 m$^2$/g.

The binder employable in the formation of the magnetic recording layer of the invention can be selected from known resins such as thermoplastic resins, thermosetting resins, and reactive resins. These resins can be employed singly or in combination.

Examples of the employable resins include cellulose derivatives (e.g., nitrocellulose and cellulose acetate), vinyl chloride/vinyl acetate copolymer resins, (e.g., vinyl chloride/vinyl acetate copolymers, vinyl chroride/vinyl acetate/vinylalcohol copolymers, and vinyl chloride/vinyl acetate/maleic acid anhydride copolymers), vinylidene chloride resins (e.g., vinylidene chloride/vinyl chloride copolymers, and vinylidene chloride/acrylonitrile copolymers), polyester resins (e.g., alkyd resin and linear polyester), acrylic resins (e.g., acrylic acid/acrylonitrile copolymer and methyl acrylate/acrylonitrile copolymer), polyvinyl acetal resins, polyvinyl resin, phenoxy resin, epoxy resin, butadiene/acrylonitrile copolymer resin, polyurethane resin and urethane epoxy resin.

If the above-mentioned resin is used with polyisocyanate compound as a binder, the magnetic recording layer of the invention can be hardened to a greater extent. The polyisocyanate compounds which can be used are, for example, adducts of 3 moles of diisocyanate and 1 mole of trimethylol propane (e.g., tolylene diisocyanate, xylilene diisocyanate, hexamethylene diisocyanate), adducts of 3 moles of hexamethylene diisocyanate and buret, isocyanurate compounds of 5 moles of tolylene diisocyanate, isocyanurate adducts of 3 moles of tolylene diisocyanate and 2 moles of hexamethylene diisocyanate and polymer compounds of diphenylmethane diisocyanate.

The amount of the binder is generally in the range of 10 to 100 parts by weight and preferably in the range of 15 to 50 parts by weight per 100 parts by weight of the ferromagnetic powder.

It is necessary to include in the magnetic recording layer of the recording medium of the invention an inorganic plate powder (i.e., inorganic particles in the form of plate or the like) having the maximum diameter of not larger than 1.0 μm and a thickness of not larger than 0.1 μm. The maximum diameter of the inorganic plate powder preferably is in the range of 0.05 to 0.8 μm. The thickness of the inorganic plate powder preferably is in the range of 0.001 to 0.1 μm, and more preferably 0.008 to 0.1 μm.

The values of the maximum diameter and thickness used herein mean average values of the maximum diameter and thickness of the inorganic plate powder contained in the magnetic recording layer.

The inorganic plate powder incorporated into the magnetic recording layer serves as a reinforcing member to enhance of strength of the recording layer. Accordingly, the magnetic recording layer shows an enhanced resistance to scratching and retains more effectively a ferromagnetic powder in the layer. The reason is thought to be as follows. In the course of the magnetic orienting process, most of the inorganic plate powder is automatically arranged almost in parallel to the oriented ferromagnetic powder (which is generally in the form of needle crystals) in such a manner that the oriented ferromagnetic particles are sandwiched between the oriented inorganic plate particles. Accordingly, the ferromagnetic powder and the magnetic recording layer are both protected by the inorganic plate powder.

An inorganic plate powder having the maximum diameter of larger than 1.0 μm and a thickness of larger than 0.1 μm is not easily dispersible in the magnetic recording layer, and accordingly not only is not appropriate for improving the physical strength of the recording layer but also is liable to disturb the electromagnetic conversion characteristics of the recording medium.

There is no specific limitation on material of the inorganic plate powder employable in the invention. An inorganic plate powder of natural origin or a synthetically produced inorganic plate powder can be employed. Examples of the inorganic plate powder of natural origin include kaolinite, illite, serocote, vermiculite and montmorillonite in the form of plate powder. Examples of the synthetically produced inorganic plate powder include $Al_2O_3$, $Fe_2O_3$, $Cr_2O_3$, ZnO, $MgCO_3$, $BaSO_4$ and $Al(OH)_3$ in the form of plate powder.

The inorganic plate power of the invention means an inorganic plate powder which has the maximum diameter and a thickness defined hereinbefore and has the maximum diameter (i.e., maximum diameter on the plate surface plane) larger than the thickness thereof. There is no specific limitation on the shape of the plate surface. For example, the plate surface takes a shape of polygon, circle, etc.

The maximum diameter of the inorganic plate powder preferably is 3 to 200 times, more preferably 7 to 100 times, larger than the thickness thereof. There is no specific limitation on a ratio of the maximum diameter to the minimum diameter of the plate powder. Generally, the ratio of the maximum diameter to the minimum diameter ranges from 1 (namely, circular shape) to 50. The ratio preferably ranges from 1 to 5.

It is noted that the magnetic recording medium of the invention gives less clogging to a magnetic head employed in contact therewith. The reason is thought as follows. Some portion of the incorporated inorganic plate particles are exposed over the surface of the magnetic recording layer and another portion is fixed into the layer. The exposed portion effectively serves as abrasive to remove materials deposited on the surface of the magnetic head such as dropped ferromagnetic powder, dropped binder, and other dropped materials. Particularly, most of the inorganic plate powder has a hardness enough for serving as an abrasive, for instance, $\alpha$-alumina belonging to $Al_2O_3$ has a Vickers hardness of 2,300.

There is no specific limitation on the amount of the inorganic plate powder incorporated into the magnetic recording layer. However, the inorganic plate powder is generally incorporated in the layer in a amount ranging from 0.1 to 8% by weight, preferably 0.2 to 7% by weight based on the ferromagnetic powder. Incorporation of an excessive amount of the inorganic plate powder may disturb the electromagnetic conversion characteristics. Too small amount of the inorganic plate powder may not improve the running property of the magnetic recording layer.

A magnetic recording medium of the invention can contain in the recording layer a known granular organic or inorganic filler in addition to the inorganic plate powder. The granular filler may have a mean diameter in the range of 0.01 to 0.8 $\mu$m, preferably 0.06 to 0.4 $\mu$m. Examples of the granular filler include carbon black, graphite, tungsten disulfide, boron nitride, calcium carbonate, aluminum carbonate, iron oxide, titanium dioxide, magnesium oxide, zinc oxide, calcium oxide, lithopone, talc and other known abrasives. Carbon black having a mean diameter of 0.015 to 0.2 $\mu$m is particularly preferred.

The granular filler may be employed in an amount of not more than 10 weight parts per 100 weight parts of the ferromagnetic powder.

The magnetic recording medium of the present invention can be produced by a process comprising the steps of first by preparing a magnetic paint (or dispersion) containing the ferromagnetic powder, binder, inorganic plate powder, and optional additives such as dispersing agent, lubricant, stabilizer and antistatic agent in an organic solvent such as methyl ethyl ketone, or cyclohexane, then applying this magnetic paint onto a nonmagnetic support, and processing to dryness. Generally, a magnetic recording layer is formed by applying the magnetic paint directly on a nonmagnetic support, but it is also possible to provide an adhesive layer or a subbing layer between the magnetic paint layer and the nonmagnetic support.

The dispersing agent employable is, for example, a fatty acid having 12 to 22 carbon atoms (e.g., caprylic acid, capric acid, lauric acid, myristic acid, palmitic acid, stearic acid, oleic acid, elaidic acid, linoleic acid, linolenic acid; a soap of an alkali metal (e.g., lithium, sodium or potassium) or an alkaline earth metal (e.g., magnesium, calcium or barium) of the above-stated fatty acid; a fatty acid amide derived from the fatty acid, an aliphatic amine, a higher alcohol, a polyalkyleneoxide alkylphosphate ester, an alkylphosphate ester, an alkylborate ester, a sarcosinate, an alkyl ether esters, or other known disperser or surfactant such as a trialkylpolyolefin quaternary ammonium salt and lecithin.

The lubricant is, for example, a fatty acid, a higher alcohol, a fatty acid ester of a monovalent fatty acid having 12 to 20 carbon atoms and a mono/polyhydric alcohol having 3 to 20 carbon atoms (e.g., butyl stearate or sorbitan oleate); a mineral oil, an animal or vegetable oil, an olefin polymer having a low molecular weight, an $\alpha$-olefin polymer having low molecular weight, or other known lubricant, for instance, for plastics (e.g., graphite powder, molybdenum disulfide powder or teflon powder).

The antistatic agent can be, for example, a natural surfactant (e.g., saponin), a nonionic surfactant (e.g., of alkylenoxide type, of glycerol type, or of glycidol type), a cationic surfactant (e.g., higher alkylamine, quarternary ammonium salt, heterocyclic phosphonium compound such as pyridine or sulfonium compounds), an anionic surfactant (e.g., carboxylic acid, sulfonic acid, phosphate or compound having acid groups such as sulfuric ester-type or phosphoric ester type), and an amphoteric surfactant (e.g., amino acid, amino sulfonic acid, sulfuric or phosphoric ester of amino alcohol).

The examples and the comparison examples of the present invention are given below. In the following examples, the expression "parts" means "parts by weight", otherwise specified. The alumina plate powders having the specific maximum diameter and thickness were obtained by subjecting a commercially available alumina plate powder (A-420 available from Showa Light Metal Co., Ltd., Japan) to classification.

EXAMPLE 1

The components indicated below were mixed dispersely to give a magnetic paint.

Ferromagnetic alloy powder (Fe-Ni alloy, Ni content: approx. 5 wt. %, specific surface area(S-BET): 45 $m^2/g$)—100 parts Vinyl chloride/vinyl acetate/maleic acid anhydride copolymer (copolymerization ratio=86:13:1, degree of polymerization: 400) 12 parts Polyurethane resin (N-2301, available from Japan Polyurethane Co., Ltd.)—12 parts Polyisocyanate (Colonate L, available from Japan Polyurethane Co., Ltd.)—8 parts Carbon black (particle size: 0.04 $\mu$m)—2 parts Inorganic plate powder (alumina plate powder maximum diameter: 0.4 μm), thickness: 0.04 μm) 5 parts
Methyl ethyl ketone—300 parts The magnetic paint was coated on a polyethylene terephthalate film having the thickness of 10 μm so that the resultant layer after being dried would have the thickness of 3.0 μm. While the layer was wet, the layer was treated with an electromagnet to give a magnetic orientation. After the coated layer was dried, the dried layer was subjected to supercalendering in order to make the surface of the layer smooth. The sheet obtained was then slitted into a video tape (VHS type) having the width of ½ inch.

The resulting video tape was repeatedly run at a half speed of the ordinary speed in contact with a ferrite head in a video-tape recorder (V-500D available from Toshiba Co., Ltd.). Then, the number of times at which the clogging of the magnetic head (namely, clogging times) was observed was detected. The video tape prepared as above gave no clogging on the magnetic head even after the video tape-running was repeated as many as 200 times.

In the above running procedure, the regeneration output (video output) was 5 dB at 1 μm. This value is a relative value based on that the regeneration output of Super HG-T-120 (tradename of a video tape of Fuji Photo Film Co., Ltd.) is 0 dB.

Further, the number of drop-out at 15 μs occurring in a minute was counted by means of a dropout counter VD-3D (available from Victor Company of Japan, Ltd.). The number of the drop-out was 4.

EXAMPLE 2

The procedure of Example 1 was repeated except that the alumina plate powder was replaced with a kaolinite plate powder (maximum diameter: 0.5 μm, thickness: 0.01 μm) to prepare a video tape.

The resulting video tape was examined in the same manner as described in Example 1.

The video tape prepared as above gave no clogging on the magnetic head even after the video tape-running was repeated as many as 200 times.

In the above running procedure, the regeneration output (video output) was 5 dB a 1 μm. The number of the drop-out was 4.

EXAMPLE 3

The procedure of Example 1 was repeated except that the alumina plate powder was replaced with other alumina plate powder (maximum diameter: 0.9 μm, thickness: 0.08 μm) to prepare a video tape.

The resulting video tape was examined in the same manner as described in Example 1.

The video tape prepared as above gave no clogging on the magnetic head even after the video tape-running was repeated as many as 200 times.

In the above running procedure, the regeneration output (video output) was 5 dB at 1 μm. The number of the drop-out was 10.

EXAMPLE 4

The procedure of Example 1 was repeated except that the alumina plate powder was replaced with other alumina plate powder (maximum diameter: 0.6 μm, thickness: 0.08 μm) to prepare a video tape.

The resulting video tape was examined in the same manner as described in Example 1.

The video tape prepared as above gave no clogging on the magnetic head even after the video tape-running was repeated as many as 200 times.

In the above running procedure, the regeneration output (video output) was 5 dB at 1 μm. The number of the drop-out was 6.

EXAMPLE 5

The procedure of Example 1 was repeated except that the alumina plate powder was replaced with other alumina plate powder (maximum diameter: 0.4 μm, thickness: 0.04 μm) to prepare a video tape.

The resulting video tape was examined in the same manner as described in Example 1.

The video tape prepared as above gave no clogging on the magnetic head even after the video tape-running was repeated as many as 200 times.

In the above running procedure, the regeneration output (video output) was 2 dB at 1 μm. The number of the drop-out was 4.

COMPARISON EXAMPLE 1

The procedure of Example 1 was repeated except that the alumina plate powder was replaced with other alumina plate powder (maximum diameter: 1.2 μm, thickness: 0.15 μm) to prepare a video tape.

The resulting video tape was examined in the same manner as described in Example 1.

The video tape prepared as above gave no clogging on the magnetic head even after the video tape-running was repeated as many as 200 times.

In the above running procedure, the regeneration output (video output) was 5 dB at 1 μm. However, the number of the drop-out was as many as 20.

COMPARISON EXAMPLE 2

The procedure of Example 1 was repeated except that the alumina plate powder was replaced with an alumina granular powder (maximum diameter: 0.5 μm) to prepare a video tape.

The resulting video tape was examined in the same manner as described in Example 1.

The video tape prepared as above gave clogging on the magnetic head when the video tape-running was repeated up to 100 times.

In the above running procedure, the regeneration output (video output) was 5 dB at 1 μm. The number of the drop-out was 4.

COMPARISON EXAMPLE 3

The procedure of Example 1 was repeated except that the alumina plate powder was replaced with other alumina plate powder (maximum diameter: 1.2 μm, thickness: 0.04 μm) to prepare a video tape.

The resulting video tape was examined in the same manner as described in Example 1.

The video tape prepared as above gave no clogging on the magnetic head even after the video tape-running was repeated as many as 200 times.

In the above running procedure, the regeneration output (video output) was 5 dB at 1 μm. However, the number of the drop-out was as many as 18.

COMPARISON EXAMPLE 4

The procedure of Example 1 was repeated except that the alumina plate powder was replaced with other alumina plate powder (maximum diameter: 0.9 μm, thickness: 0.15 μm) to prepare a video tape.

The resulting video tape was examined in the same manner as described in Example 1.

The video tape prepared as above gave clogging on the magnetic head when the video tape-running was repeated up to 100 times.

In the above running procedure, the regeneration output (video output) was 5 dB at 1 μm. The number of the drop-out was 4.

We claim:

1. In a magnetic recording medium comprising a non-magnetic support and a magnetic recording layer provided on said support, said magnetic recording layer comprising a ferromagnetic powder dispersed in a binder, the improvement which comprises said magnetic recording layer contains an $Al_2O_3$ plate powder having a diameter in the range of 0.05 to 1.0 μm and a thickness in the range of 0.001 to 0.1 μm, said $Al_2O_3$ plate powder being contained in the recording layer in an amount of not more than 10% by weight of the ferromagnetic metal powder and said ferromagnetic powder being a ferromagnetic metal powder having a specific surface area of not less than 40 $m^2/g$.

2. The magnetic recording medium as claimed in claim 1, wherein the maximum diameter of said $Al_2O_3$ plate powder is in the range of 0.05 to 0.8 μm.

3. The magnetic recording medium as claimed in claim 1, wherein the maximum diameter of said $Al_2O_3$ plate powder is 3 to 200 times larger than the thickness thereof.

4. The magnetic recording medium as claimed in claim 2, wherein said $Al_2O_3$ plate powder is contained in the recording layer in an amount of 0.1 to 8 % by weight of the ferromagnetic powder.

5. The magnetic recording medium as claimed in claim 1, wherein said magnetic recording layer further contains a granular filler.

6. The magnetic recording medium as claimed in claim 1, wherein said ferromagnetic powder is a ferromagnetic metal powder having a specific surface area of not less than 45 $m2/g$.

7. The magnetic recording medium as claimed in claim 6, wherein said $Al_2O_3$ plate powder has a maximum diameter in the range of 0.05 to 0.8 μm which is 3 to 200 times larger than the thickness thereof, and wherein said powder is contained in the recording layer in an amount of 0.1 to 8% by weight of the ferromagnetic powder.

8. The magnetic recording medium as claimed in claim 7, wherein the maximum diameter of said $Al_2O_3$ plate powder is 7 to 100 times larger than the thickness thereof and said $Al_2O_3$ plate powder is contained in the recording medium in an amount of 0.2 to 7% by weight of the ferromagnetic powder.

9. The magnetic recording medium as claimed in claim 3, wherein the maximum diameter of said $Al_2O_3$ plate powder is 7 to 100 times larger than the thickness thereof.

10. The magnetic recording medium as claimed in claim 4, wherein said $Al_2O_3$ plate powder is contained in the recording layer in an amount of 0.2 to 7 weight % by weight of the ferromagnetic powder.

* * * * *